US00RE49870E

(19) United States
(12) Reissued Patent
Palmer et al.

(10) Patent Number: US RE49,870 E
(45) Date of Reissued Patent: *Mar. 12, 2024

(54) SYSTEM AND METHOD FOR CONTROLLING AN ELECTRICITY SUPPLY

(71) Applicant: The Technology Partnership PLC, Melbourn Royston (GB)

(72) Inventors: Mathew R. Palmer, Melbourn Royston (GB); Antony W. Rix, Melbourn Royston (GB); David R. Anderson, Melbourn Royston (GB); David S. Smith, Melbourn Royston (GB); Matthew C. B. Lumb, Melbourn Royston (GB)

(73) Assignee: The Technology Partnership PLC, Melbourn Royston (GB)

( * ) Notice: This patent is subject to a terminal disclaimer.

(21) Appl. No.: 16/109,099

(22) Filed: Aug. 22, 2018

Related U.S. Patent Documents

Reissue of:
(64) Patent No.: 9,450,406
Issued: Sep. 20, 2016
Appl. No.: 13/885,013
PCT Filed: Nov. 11, 2011
PCT No.: PCT/EP2011/069978
§ 371 (c)(1),
(2) Date: Jul. 24, 2013
PCT Pub. No.: WO2012/062921
PCT Pub. Date: May 18, 2012

U.S. Applications:
(63) Continuation of application No. 15/679,668, filed on Aug. 17, 2017, which is an application for the reissue
(Continued)

(30) Foreign Application Priority Data

Nov. 11, 2010 (GB) ..... 1019061

(51) Int. Cl.
*H02J 3/00* (2006.01)
*H02J 9/06* (2006.01)
*H02J 13/00* (2006.01)

(52) U.S. Cl.
CPC ..... *H02J 13/00026* (2020.01); *H02J 9/061* (2013.01)

(58) Field of Classification Search
CPC ..... H02J 13/00026
See application file for complete search history.

(56) References Cited

U.S. PATENT DOCUMENTS 4,894,764 A 1/1990 Meyer et al.
5,784,218 A 7/1998 Fujii et al.
(Continued)

FOREIGN PATENT DOCUMENTS

CN WO 2010124546 A1 * 11/2010 ..... H02J 3/32
EP 2180571 A2 4/2010
(Continued)

OTHER PUBLICATIONS

Office Action dated Sep. 15, 2020 in connection with U.S. Appl. No. 15/679,668, 23 pages.
(Continued)

*Primary Examiner* — Fred O Ferris, III

(57) ABSTRACT

A system for controlling an electricity supply to a load comprises at least one battery for storing energy. The system also comprises a controller for determining when to switch between a first mode wherein electricity is supplied to the load from a mains electricity circuit; and a discharging mode wherein electricity is supplied from the battery to the load via the mains electricity circuit. The determining is based on information associated with the electricity supply.

17 Claims, 8 Drawing Sheets

Related U.S. Application Data of Pat. No. 9,450,406, filed as application No. PCT/EP2011/069978 on Nov. 11, 2011.

(56) References Cited

U.S. PATENT DOCUMENTS

| | | | | |
|---|---|---|---|---|
| 8,613,041 | B2 * | 12/2013 | Hopen | H04L 63/029 726/1 |
| 8,975,779 | B2 | 3/2015 | Cooper et al. | |
| 9,408,268 | B2 * | 8/2016 | Recker | F21S 9/02 |
| 9,954,361 | B2 | 4/2018 | Covic et al. | |
| 2004/0263116 | A1 | 12/2004 | Doruk et al. | |
| 2007/0200433 | A1 | 8/2007 | Kelty | |
| 2010/0017045 | A1 | 1/2010 | Nesler et al. | |
| 2011/0133558 | A1 * | 6/2011 | Park | H02J 3/32 307/66 |

FOREIGN PATENT DOCUMENTS

| | | | | |
|---|---|---|---|---|
| GB | 2474305 | A | 4/2011 | |
| WO | 2006138592 | A2 | 12/2006 | |
| WO | WO2010/12456 | A1 * | 12/2006 | |
| WO | 2008015502 | A1 | 2/2008 | |
| WO | WO2010/124546 | * | 11/2010 | H02J 3/32 |
| WO | WO2010124546 | A1 | 11/2010 | |

OTHER PUBLICATIONS

Non-final Office Action in connection with U.S. Appl. No. 15/679,668 dated Apr. 10, 2020, 18 pages.

Non-final Office Action dated Mar. 10, 2021 in connection with U.S. Appl. No. 15/679,668, 25 pages.

Notice of Allowance dated Aug. 17, 2021, in connection with U.S. Appl. No. 15/679,668, 13 pages.

Search Report dated May 25, 2011 in connection with United Kingdom Patent Application No. GB1019061.9.

International Search Report dated Mar. 7, 2013 in connection with International Patent Application No. PCT/EP2011/069978.

Written Opinion of the International Searching Authority dated Mar. 7, 2013 in connection with International Patent Application No. PCT/EP2011/069978.

Okui, Y., et al., "Development of line interactive type UPS using novel control system", IEEE International Telecommunications Energy Conference, Yokohama, Japan, Oct. 19-23, 2003, p. 796-801.

* cited by examiner

SYSTEM AND METHOD FOR CONTROLLING AN ELECTRICITY SUPPLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for reissue of U.S. Pat. No. 9,450,406.* The present application *is a reissue continuation of U.S. patent application Ser. No. 15/679,668 filed Aug. 17, 2017, which is an application for reissue of U.S. Pat. No. 9,450,406 issued Sep. 20, 2016, on U.S. patent application Ser. No. 13/885,013 filed Jul. 24, 2013, which* claims priority under 35 U.S.C. § 365 to International Patent Application No. PCT/EP2011/069978 filed Nov. 11, 2011, entitled "SYSTEM AND METHOD FOR CONTROLLING AN ELECTRICITY SUPPLY". International Patent Application No. PCT/EP2011/069978 claims priority under 35 U.S.C. § 365 and/or 35 U.S.C. § 119(a) to United Kingdom Patent Application No. 1019061.9 filed Nov. 11, 2010 [which]. *These disclosures* are incorporated herein by reference into the present disclosure as if fully set forth herein.

TECHNICAL FIELD

The present invention relates to a method, apparatus and system for controlling an electricity supply.

BACKGROUND

There have been concerns over carbon-induced climate change and the increasing demand for electrical energy. The increase in demand for electrical energy can be attributed to each person using more electrical appliances and more transport and heating being powered by electricity.

In recent times there has been a trend to increase the capacity of cleaner electricity generation and to persuade consumers to modify their electricity usage. One way consumers can modify their electricity usage is to reduce their overall electricity consumption. However other benefits can be derived from consumers modifying how they consume electricity.

For example, consumers' electricity usage can be modified using a known set of techniques called Demand-Side Management (DSM) which comprises measures such as improving building insulation and building automation.

Demand Response (DR) is another known technique for modifying consumer's electricity usage. DR comprises reducing or time shifting electrical loads carried out either manually by a user or automatically.

Time shifting electrical loads can be useful for modifying the time of day when a consumer places a load on the electrical transmission and distribution network and in turn the electrical generation connected thereto. In particular, the overall electricity demand on a transmission and distribution network varies over the course of a day. For example, in certain countries peaks in electricity demand often occur in the evening and early in the morning when people are using electrical appliances at home. Supplying this varying load can be challenging for the electricity transmission and distribution network operators and electricity generators.

The electricity transmission and distribution networks have to be scaled for the peak demand and generators would prefer to supply a constant base load without substantial variations.

Previously some financial incentives have been used to implement DR. Some electricity suppliers have provided a lower cost night-time electricity tariff for domestic consumers. Some industrial electricity consumers have agreements with the electricity supplier or network operator to reduce loads at peak times.

Once recent concept is a demand response aggregator which recruits electricity consumers who are willing to reduce or to time shift their electricity consumption. In this way the DR aggregator can offer the system supply operator the option of time shifting or reducing a larger aggregated load from the networks. This concept is also known as "negawatt" generation. In this way a DR aggregator can offer the system operator the option of negative electricity generation during times of peak load in the same way an electricity generator can offer conventional electricity generation.

In some countries, such as the UK, the system operator can pay for balancing services to help match supply and demand, particularly at peak times. Balancing services can vary by one or more factors and depending on the type of the balancing service, the amount paid by the system operator can vary. The factors affecting balancing services comprises one or more of the following: response time from a request to curtail a load or time shift a load; availability of curtailment capacity or load time shift capacity; time availability of the curtailment capacity or load time shift capacity; time period for which the load can be curtailed or time shifted; and the number of times per year the load can be curtailed and/or time shifted. This means a DR aggregator can be paid for balancing services and share these earnings with its recruited consumers. In particular the most valuable balancing service is a fast response load adjustment for electrical system frequency control, as the mains system frequency deviates from the ideal when there is an imbalance of supply and demand on the system.

Known solutions for implementing DR comprise manually or automatically switching off a load at the request of the system operator, via a supplier or aggregator. In the industrial and commercial sectors loads can be switched off automatically based on information relating to the electricity transmission network or perhaps manually based on information received over the telephone.

Domestic applications of DR are not yet widespread, partly because there is a need for a behaviour change by the consumers. For example, consumers in the residential sector are required to turn off e.g. air conditioning units or swimming pool pumps during peak times. However depending on the type of appliance the consumer is using, the consumer may not be willing to turn off their appliance or postpone using their appliance, for example a heater or a cooker, during peak periods. Furthermore, in some countries like the UK, there are a limited number of appliances which a consumer may be willing or able to turn off during a peak period. Moreover the cost of DR automation equipment can be substantial.

Another known way to implement DR in the domestic environment is to use smart plugs which comprise a processor which determines when to turn off an appliance based on various information. However, some appliances are not suitable for use with a smart plug which interrupts the electricity supply and the appliance, for example a washing machine, may not return to the same state after an interrupted electricity supply resumes.

An uninterruptible power supply (UPS) is a known way to supply electricity to a load, for example servers and the like. A UPS receives electricity from a mains electricity supply and in turn supplies mains energy to devices plugged into it whilst charging an internal battery at the same time. The UPS keeps the battery charged so that if the input supply is lost, the battery can be used to generate an equivalent mains output to the load for a limited time period. This means the load does not experience an interruption in its electricity supply. However, the current UPS systems are expensive and require that the UPS is rated higher than the load attached.

SUMMARY

Some embodiments may address at least one of the disadvantages or problems discussed above.

In accordance with an embodiment there is provided a system for controlling an electricity supply to a load comprising at least one battery for storing energy; and a controller for determining when to switch between a first mode wherein electricity is supplied to the load from a mains electricity circuit; and a discharging mode wherein electricity is supplied from the battery to the load via the mains electricity circuit; wherein the determining is based on information associated with the electricity supply.

Preferably the controller also determines when to switch to a charging mode wherein the battery is charged from the mains electricity circuit. The first mode can be the charging mode. Preferably the first mode is an idle mode wherein substantially no energy is transferred between the battery and the mains electricity circuit.

Preferably the system comprises a communication interface for receiving the information from a electricity network system operator or a service provider. Preferably the controller initiates connections with the electricity network system operator or a service provider via the communication interface. The information can comprise a request to switch between the idle mode, the discharging mode, and the charging mode.

Preferably the information associated with the electricity supply comprises one or more parameters of an electricity transmission and distribution network. The controller can determine when to switch when a value of the one or more parameters of the electricity transmission and distribution network is determined to be a predetermined range. The parameters of the electricity transmission and distribution network may be one or more of the following: time of the peak periods of load on the electricity network; time of the off-peak periods of load on the electricity network; price of electricity, available capacity of the electricity transmission and distribution network; time of imbalance between supply and demand on the electricity transmission and distribution network.

Preferably the system comprises a charger for charging the battery from mains electricity circuit when the system is in the charging mode. Preferably the system comprises an inverter for supplying the load with an electricity supply from the battery when the system is in the discharging mode. The controller may be configured to control the waveform of the electricity supply current from the inverter to the load. Preferably the charger and inverter comprise the same circuit. Preferably the system comprises a safety isolation switch for disconnecting the inverter output.

Preferably the system comprises a sensor for measuring one or more parameters of the electricity supply from the electricity transmission and distribution network to the load and for sending information regarding the measurements to the controller.

Preferably the controller determines to switch between the idle mode and the discharging mode or the charging mode further based on the received measurements.

Preferably the controller determines to switch from the idle mode or charging mode to the discharging mode when the current of the electricity supply to the load is above a pre-determined threshold. Preferably the sensor sends information to the controller about transitions of the current of the electricity supply to the load through one or more predetermined thresholds.

Preferably the controller determines to prevent switching to the discharging mode when information has not been received from the sensor for more than a maximum time period.

Preferably the controller determines that switching between the idle mode and the discharging mode or the charging mode is not required for a time period and controls the communication interface and sensor to reduce communication frequency for the time period.

Preferably the controller determines when to switch when a value of one or more parameters of the battery is determined to in be a predetermined range.

Preferably the controller is configured to control the rate at which the battery is charged and or discharged.

Preferably the controller is configured to prevent discharging of the battery if the loss of the electricity supply from the electricity transmission and distribution network is detected.

Preferably during the charging mode the electricity is supplied to the load from the mains electricity circuit.

Preferably the battery supplies electricity to the mains electricity circuit in the discharging mode and receives electricity from the mains electricity circuit in the charging mode using a single bi-directional connection with the mains electricity circuit.

Preferably the controller stores information about switches between the idle mode, the discharging mode and the charging mode over a time period and sends the switching information to the electricity network system operator or a service provider.

Preferably the controller may determine to carry out a battery maintenance procedure. The controller can also initiate a connection through the communication interface with another system and determines to switch based on information received from the other system.

In accordance with yet another embodiment there is provided a method for controlling an electricity supply to a oad comprising: determining when to switch between a first mode wherein the load is supplied from a mains electricity circuit, and a discharging mode wherein the electricity is supplied to the load from a battery via the mains electricity circuit; wherein the determining is based on information associated with the electricity supply.

A computer program comprising program code means adapted to perform the method may also be provided.

In accordance with yet another embodiment there is provided a control apparatus for controlling an electricity supply to a load comprising: means for determining when to switch between a first mode wherein the load is supplied from a mains electricity circuit, and a discharging mode wherein electricity is supplied to the load from a battery via the mains electricity circuit; wherein the determining is based on information associated with the electricity supply.

Various other aspects and further embodiments are also described in the following detailed description and in the attached claims.

BRIEF DESCRIPTION OF THE DRAWINGS

For a better understanding of the present invention and as to how the same may be carried into effect, reference will now be made by way of example to the accompanying drawings in which.

DETAILED DESCRIPTION

The following describes apparatus, systems and methods for controlling the electricity supply to a load from an electricity transmission network. In particular some embodiments relate to a system for storing electrical energy and later releasing it to a load in a building, under external control, to deliver financial and operational benefits to electricity utilities and consumers.

Figure 1:
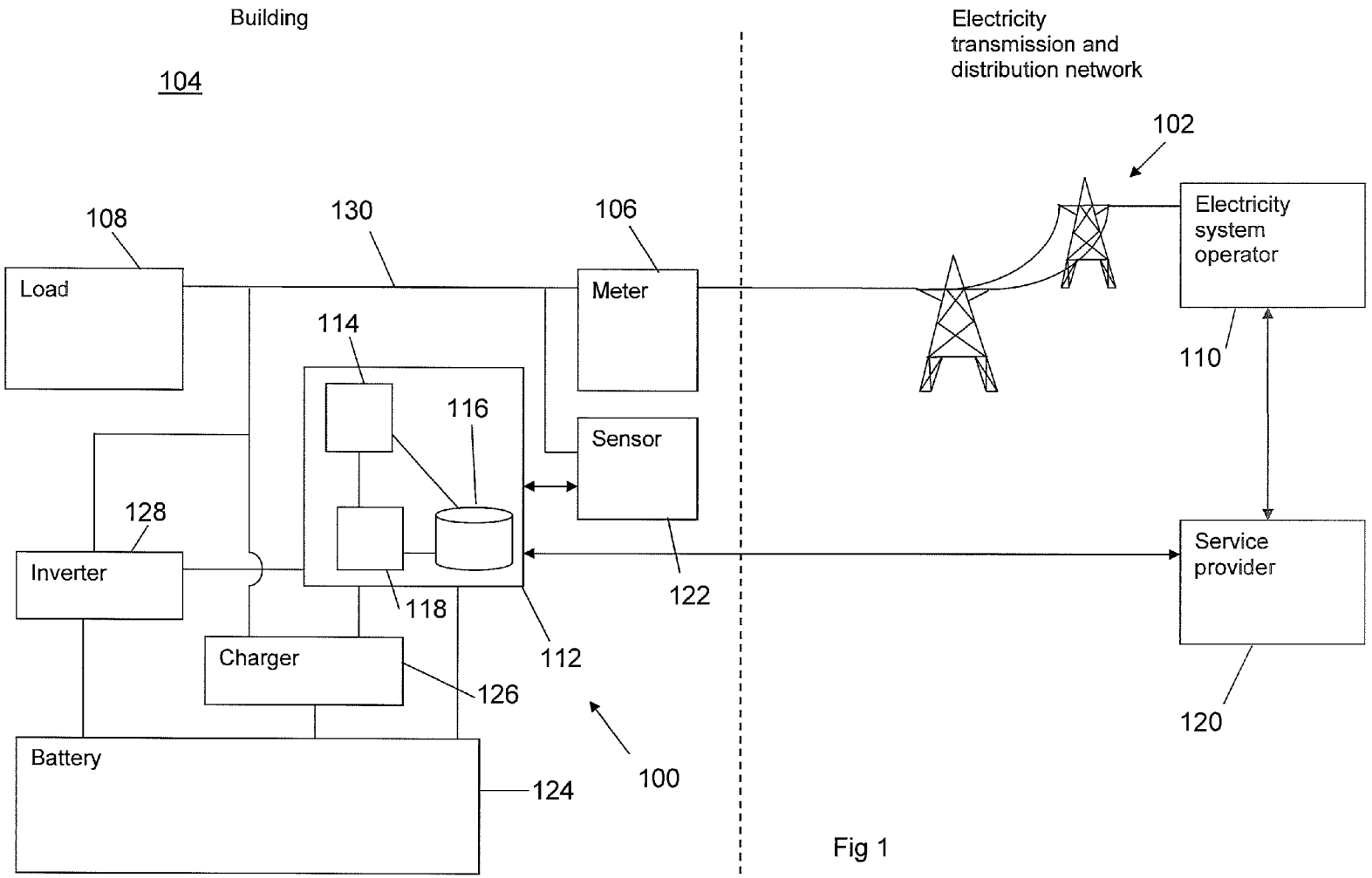
FIG. 1 illustrates a schematic diagram according to some embodiments.

In this regard reference is made to FIG. 1 which illustrates a schematic diagram according to some embodiments. An electricity transmission and distribution network or utility 102 supplies electricity to a premises or building 104 via a meter 106. The electricity transmission and distribution network 102 provides an electricity supply via one or more transformers (not shown) to step down the voltage of the electricity for the purposes of domestic or office use. Typically the electricity comprises an alternating current (AC). In this way the electricity transmission and distribution network 102 provides an electricity supply also known as "mains" electricity to the building 104 via a mains electricity circuit 130. In some embodiments the electricity supply is not limited to domestic use but can be used in other sectors such as transport or industry. Typically the electricity transmission and distribution network 102 can be controlled and managed by an electricity system operator 110.

The meter 106 comprises measuring apparatus for measuring the amount of electricity consumed by the building 104. The meter can, in some embodiments be a "smart meter" which can detect multidirectional flow of electricity; electricity being consumed or electricity being supplied by the building 104 to the electricity transmission and distribution network 102. In other embodiments, the meter is a traditional meter which only detects electricity consumed from the electricity transmission and distribution network 102.

The building 104 consumes the electricity supplied by the electricity transmission and distribution network 102. The consumption of electricity by the building 104 is represented by a load 108. The load 108 can comprise the electrical demand of one or more electrical appliances which use electricity during their operation. For example, the load 108 of a domestic building can comprise electricity being consumed by heating, air conditioning, swimming pool pumps, washing machines, televisions, cookers, lighting, and any other suitable electrical means for using electricity.

The system 100 for controlling the electricity supply in the building 104 will now be described in further detail. The system 100 comprises a battery 124, a charger 126 for charging the battery and an inverter 128 for providing a suitable electricity supply to the load 108 from the battery 124.

The battery 124 can be any type of suitable means for storing electrical energy. In some embodiments the battery 124 comprises one or more lead-acid batteries, similar to batteries used in vehicles. A lead acid battery is a flooded liquid electrolyte type. Advantageously a lead acid battery is a simple and cheap option to use in the system 100. Alternatively the battery 124 can comprise one or more sealed valve regulated lead acid battery (VRLA). A VRLA comprises an absorbent glass mat or gel electrolyte which does not require battery maintenance. In some other embodiments the battery 124 can comprise one or more lithium ion or any other suitable battery technology.

The charger 126 can be any suitable means for charging the battery 124 from the mains electricity circuit 130. In some embodiments the battery can be charged from the mains electricity circuit in the building and the charger can be connected between meter and load. In some embodiments the charger 126 charges the battery 124 at a constant, low rate. Optionally the charger 126 can have a variable charge rate.

The inverter 128 can be any suitable means for converting the electrical energy stored in the battery 124 into an electrical supply suitable for the load 108. Typically the battery 124 outputs a direct current (DC) voltage. The inverter 128 can take the DC voltage and convert the DC voltage into an AC voltage suitable for the appliances comprised in the load 108. Preferably the inverter 128 can synthesise a full wave AC voltage which is compliant with the electricity supply of the electricity transmission network. Preferably the inverter converts a 12V DC output from the battery 124 into 115V 60 Hz or 230V 50 Hz output. In some embodiments the inverter 128 and the charger 126 are connected to the mains electricity circuit 130 by the same connection. In some embodiments the same connection is a bi-directional connection. In other embodiments the inverter 128 and the charger 126 are connected to the mains electricity circuit 130 with different connections.

Figure 4:
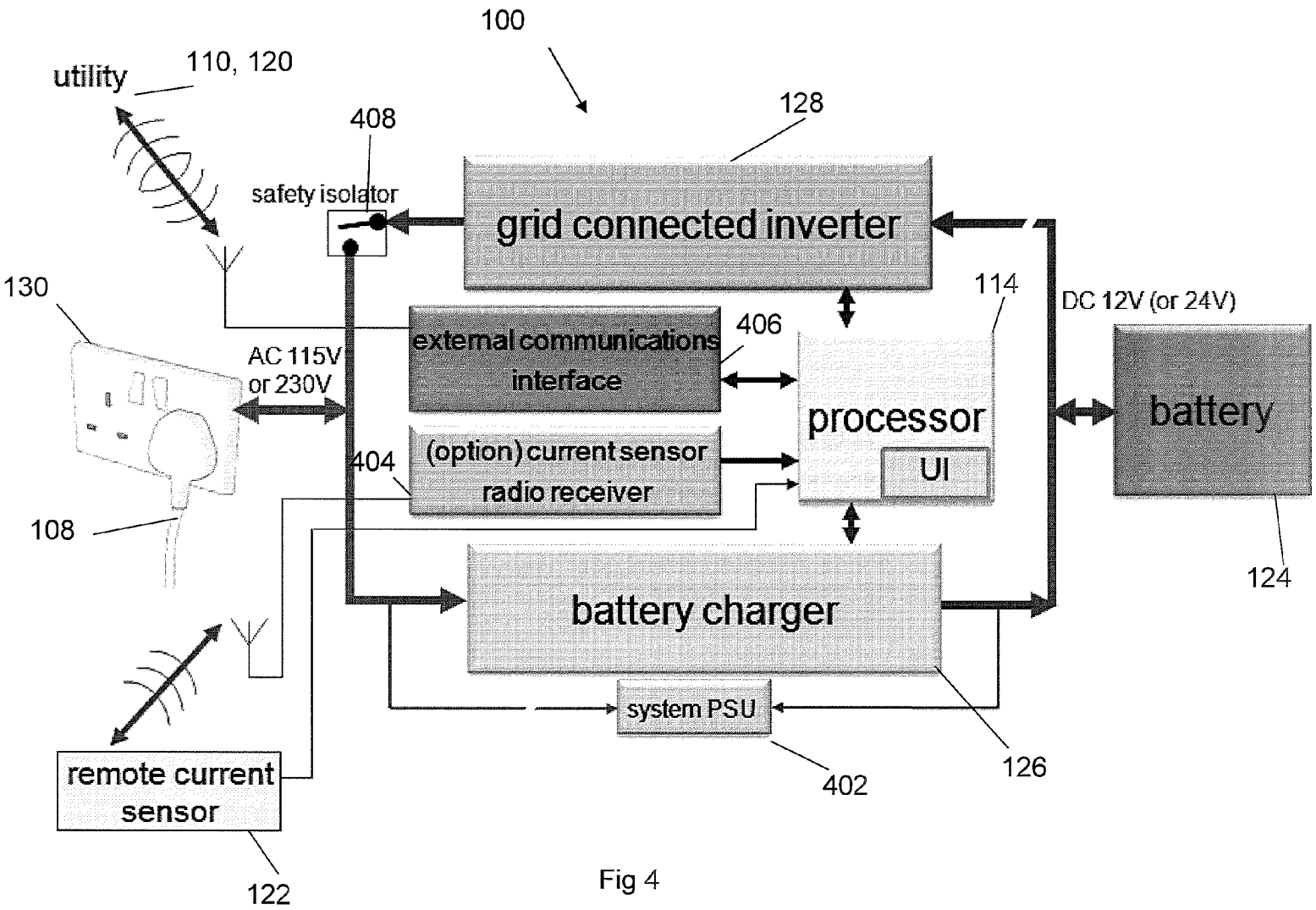
FIG. 4 illustrates a system for controlling supply of electricity according to some embodiments.

The battery 124, the charger 126 and the inverter 128 are controlled by the controlling apparatus 112 in some embodiments. The controlling apparatus 112 comprises one or more processors 114 coupled to internal memory 116 and other components 118 for controlling the supping of electricity to the load 108. The processor 114 can be linked to a user interface for receiving instructions from a user. In some embodiments the user interface comprises a 2 line LCD display and one or more input keys or may be any other suitable user interface. The controlling apparatus 112 can also comprise a power supply unit (PSU) 402 as shown in FIG. 4 which can power the controlling apparatus. The PSU 402 can be powered by the either the load 108 or the battery 124.

The processor 114 in some embodiments can be configured to execute various program codes. For example, the implemented program code may comprise a code for controlling the electricity supply to the load 108. The implemented program codes can in some embodiments be stored, for example, in the memory 116 and specifically in a program code section of the memory 116 for retrieval by the processor 114 whenever needed. The memory 116 in some embodiments can further provide a section for storing data, for example, data that has been processed in accordance with the application.

The controlling apparatus 112 can further comprise an interface 406 as shown in FIG. 4 for receiving and/or sending information from the electricity system operator 110 and/or a service provider 120. The service provider 120 in various embodiments is a demand response aggregator, an electricity retailer or a distribution network operator. The service provider 120 can provide instructions and/or information to one or more controlling apparatuses 112 in separate buildings.

The interface 406 of the controlling apparatus 112 can be an over-the-air type interface for communicating with the system operator 110 or service provider 120. In some embodiments the interface comprises a GPRS, 3G or other mobile telecommunication based interface for providing a data link over-the-air with the system operator 110 or the service provider 120. In other embodiments the interface 406 for communicating with the system operator 110 or the service provider 120 comprises a wireless network interface such as a 802.11x or WiFi™ interface. In this way the controlling apparatus 112 can communicate via the building's 104 wireless router (not shown) which provides a connection to the system operator 110 and the service provider 120 via an Internet connection. The user interface can be used to select an appropriate wireless network and input the relevant security key by the user during set up of the system 100.

Alternatively, the wireless interface 406 can be a home area network (HAN) which is connected to a suitable gateway means. In some embodiments the HAN can be a short range radio link conforming to the Zigbee™ standard. Indeed the controlling apparatus 112 may include any suitable radio interface for communicating with the system operator 110 and/or the service provider 120.

In some other embodiments the interface 406 of the controlling apparatus 112 can be a wired type connection such as an Ethernet connection with the building's 104 router (not shown) which provides a connection to the system operator 110 and the service provider 120 via an Internet connection. Alternatively the interface 406 can be a powerline communications (PLC) type interface. In this way a PLC interface can use the building's 104 power lines to communicate with the system operator 110 and/or the service provider 120. In some other embodiments, a standard public operating telephone system (POTS) line can be used to communicate between the controlling apparatus 112 and the system operator 110 and/or the service provider 120. Indeed the controlling apparatus may comprise any suitable interface for wired communications. Furthermore the controlling apparatus can comprise a plurality of the aforementioned interfaces to provide redundancy in communications with the system operator 110 and/or the service provider 120.

The processor 114 of the controlling apparatus 112 can be configured to communicate with the system operator 110 and/or the service provider 120 using a standardised communication protocol. In particular, the processor 114 can be configured to send messages comprising a DLMS/COSEM (device language message specification/companion specification for energy metering) format.

In some embodiments the communication interface 406 can be optional. For example, the information from the electricity transmission network, such as the times of offpeak and peak electricity tariffs can be pre-programmed into the memory 116 of the controlling apparatus 112.

A sensor 122 is located near the meter 106 for detecting and measuring the electricity supplied to the building 104. In some embodiments the sensor 122 is a current sensor for detecting the magnitude and direction of the electricity supply current. The sensor 122 can be attached to the live input electricity cable either the electricity transmission and distribution network side 102 of the meter 106 or the building 104 side of the meter. In other embodiments the sensor can be configured to measure one or more other parameters of the electricity supply such as voltage and power factor.

Figure 2:
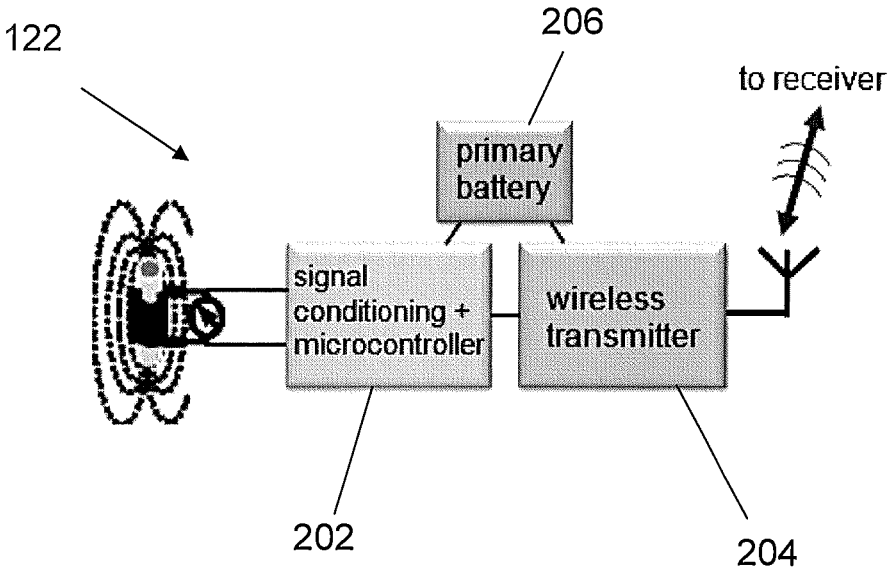

The sensor 122 according to some embodiments is shown in FIG. 2, which shows a schematic representation of the wireless sensor 122. The sensor 122 comprises a processor 202 and a wireless interface comprises a transmitter/receiver 204 for communicating with the controlling apparatus 112 and a power source 206 such as a battery. The controlling apparatus 112 comprises a reciprocal wireless transmitter/receiver 404 as shown in FIG. 4. The wireless interface between the sensor 122 and the controlling apparatus 112 can comprise any suitable wireless communication format such as Zigbee™ or Bluetooth™ or another suitable two way wireless communication format. Alternatively the wireless interface can be a one way wireless interface whereby the sensor 122 only sends measurements to the controlling apparatus 112. The sensor 122 can also comprise circuitry for performing digital signal processing such as signal conditioning on the current measurements. In some embodiments the processor of the wireless sensor can detect whether the battery 206 of the wireless sensor has a low voltage. The processor of the sensor 122 can then send an indication to the controlling apparatus 112 that the wireless sensor 122 needs a replacement battery.

Figure 3:
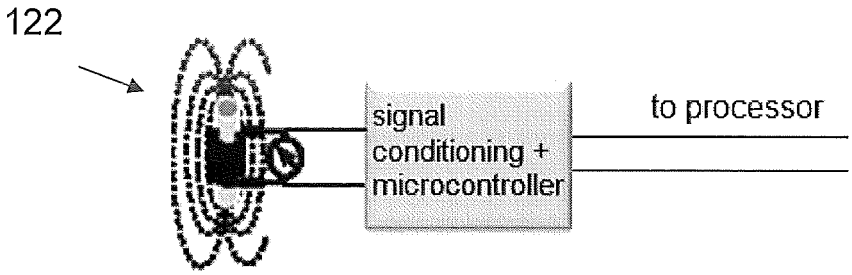
FIGS. 2 and 3 illustrate schematic diagrams of different types of connections between a sensor and a controller according to some embodiments.

The sensor according to some other embodiments is shown in FIG. 3, which shows a schematic representation of the wired sensor 122. The sensor 122 comprises a processor 202 and a wired interface with the controlling apparatus 112. In this way the sensor 122 sends the measurements via a fixed wire to the controlling apparatus 112. A wire connection between the controlling apparatus 112 and the sensor 122 means that the sensor can be powered by the controlling apparatus 112 and can operate continuously.

In some embodiments the sensor 122 according the embodiments described in FIG. 2 or 3 makes measurements of the electricity supply continuously. Alternatively the sensor 122 periodically makes measurements of the electricity supply. Indeed the sensor 122 can change the frequency with which measurements of the electricity supply are made. In some embodiments the controlling apparatus 112 can configure the sensor 122 and in particular configure how the sensor 122 operates. For example, the sensor 122 of FIG. 2 can perform measurements more frequently during peak demand periods of the electricity transmission and distribution network 102 than measurements made during the off-peak demand periods of the electricity transmission and distribution network 102. This can reduce the amount of energy drawn from the battery 206.

In some embodiments the sensor 122 can be used to detect the condition where a net flow of electricity out of the building 104 is possible, so that the controlling apparatus 112 can prevent the net flow of electricity out of the building 104. Optionally the sensor 122 may not been needed. For example, in some embodiments the meter 106 is a "smart meter". This means that the meter 106 is designed to allow electricity to flow either in or out of the building 104.

FIG. 4 shows are more detailed embodiment of the system 100 for controlling the electricity supply in the building 104. For the purposes of clarity the same numbering has been used as in the embodiments shown in FIG. 1. The embodiments shown in FIG. 4 are the same as the embodiments shown in FIG. 1 except that the system 100 for controlling the electricity supply further comprises a safety isolator 408.

The safety isolator 408 is configured to prevent electric shock when the system 100 or the electricity transmission and distribution network 102 requires maintenance, or when the system 100 is disconnected from the load 108. For example, if an out of range voltage, such as an undervoltage, is detected when there is a load present or if over-current flowing out is detected, then the electricity supply from outside the building 104 may be lost. In order to protect utility personnel potentially working outside the building 104 on fault rectification, the safety isolator may automatically open the connection from the inverter 128 to the electricity supply. The processor 114 of the controlling apparatus 112 may be configured to also shut down the inverter 128 and charger 126 when the safety isolator 408 trips. Furthermore, the safety isolator 408 can also automatically open the connection from the inverter 128 to the electricity supply when no current, or lower than expected current, is flowing out when the inverter 128 is on, or if over-voltage is detected at the output of the inverter. In order to protect a user from a potential electric shock on the plug, the safety isolator 408 will automatically open the connection from the inverter output to the mains electricity supply. Again, the processor 114 of the controlling apparatus 112 may be configured to also shut down the inverter 128 and charger 126 when the safety isolator 408 trips. In some embodiments the safety isolator 408 is actuated by the processor 114 of the controlling apparatus 112 once the processor 114 determines an under voltage or no current flowing when the inverter 128 is on based on received sensor 122 measurements. In some embodiments there may be a separate sensor (not shown) for detecting the current and/or voltage for actuating the safety isolator 408.

Figure 5:
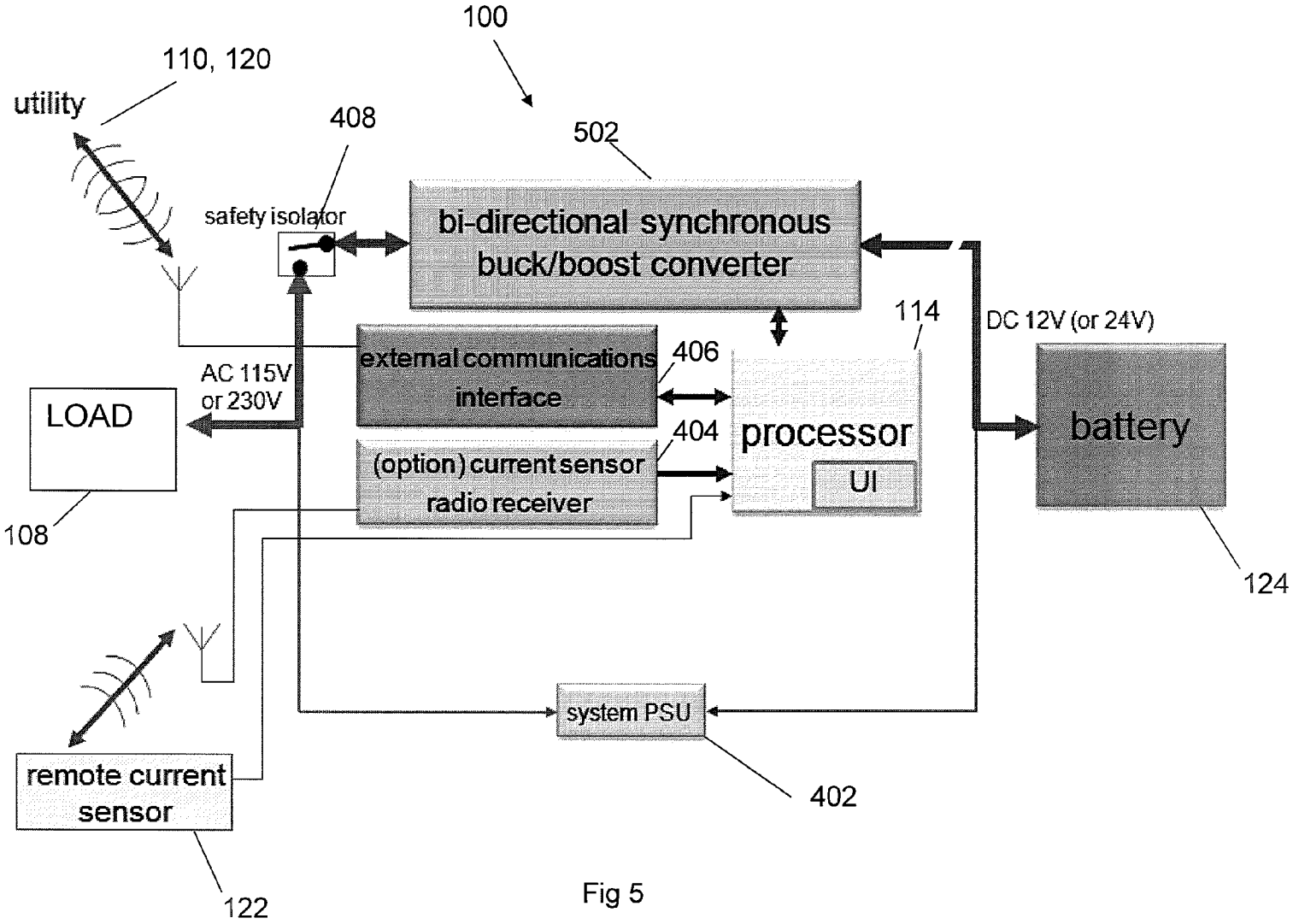
FIG. 5 illustrates a system for controlling supply of electricity according to some other embodiments.
Figure 6:
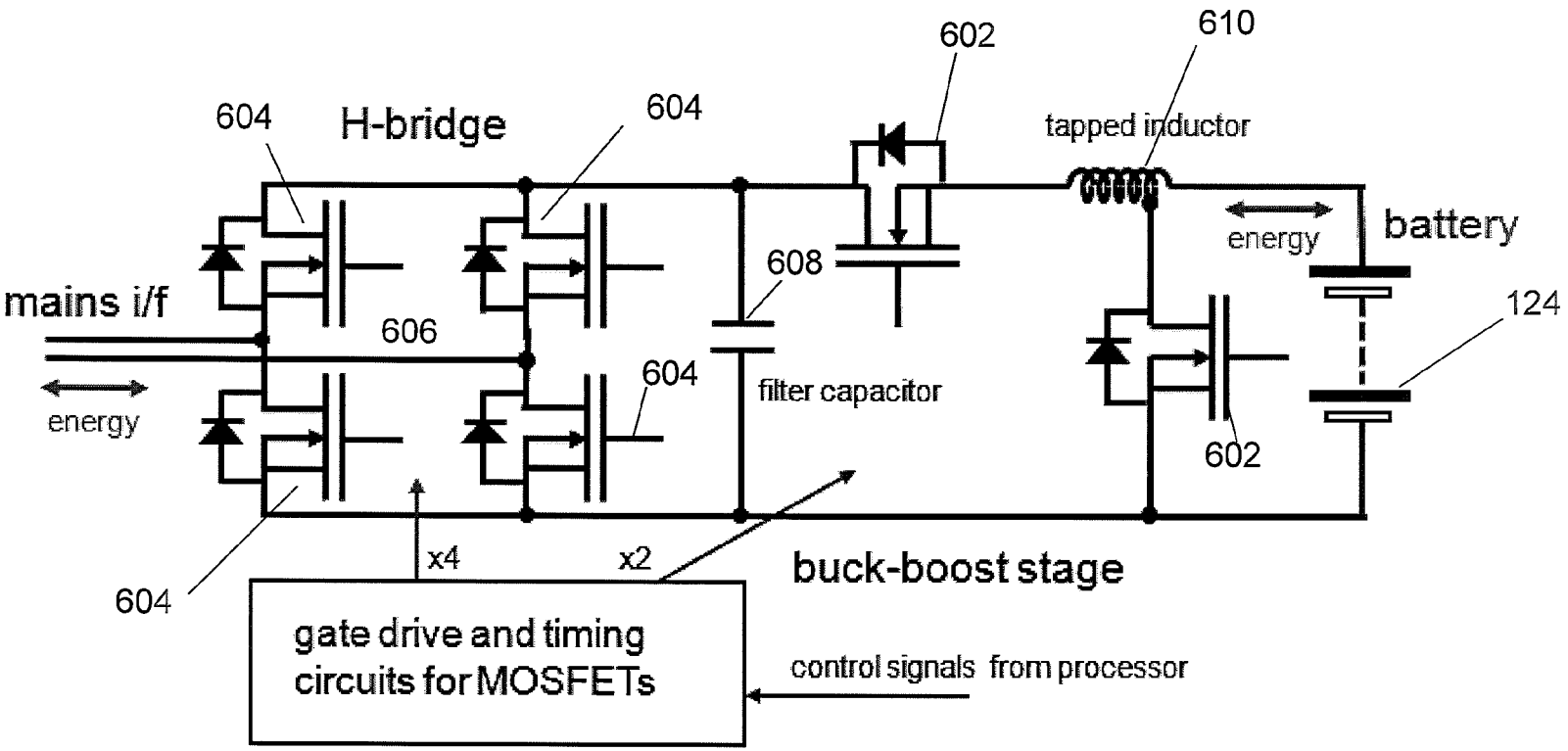
FIG. 6 illustrates a circuit diagram of a converter according to some more detailed embodiments.

FIG. 5 shows a schematic representation of some alternative embodiments. FIG. 5 is the same as the embodiments described in reference to FIG. 4 except that the inverter 128 and charger 126 are replaced with a bi-directional synchronous buck boost converter 502. FIG. 6 shows a more detailed circuit diagram of the converter 502 used in the embodiments as shown in FIG. 5.

The converter 502 comprises 2 high frequency switching MOSFETs 602 for both charging and discharging. The converter 502 further comprises four lower frequency switching MOSFETs 604 in the H-Bridge 606. The lower frequency switching MOSFETs 604 can have a frequency of 100 Hz.

The converter 502 comprises a filter capacitor 608 which is small to improve reliability and reduce manufacturing costs over large capacitors. In some embodiments the battery 124 can be subjected to a minimally filtered 100 Hz current waveform. The capacitor 608 can be used to filter out the high switching frequency of the buck boost converter. In some circumstances the battery life 124 can be reduced if the battery is subjected to large current fluctuations. In some cases the filter capacitor 608 is set to a high enough value to avoid subjecting the battery 124 to large current fluctuations.

The converter 502 further comprises a tapped inductor 610 which is used to manage the duty cycle of the MOSFET 602 switching. As the duty cycle varies greatly in order to synthesise 100 Hz semi-sinewaves, some embodiments comprise means for limiting the maximum duty cycle. The tapped inductor 610 can help reduce voltage stress and the maximum duty cycle of the converter 502.

For battery 124 discharge the converter 502 operates in a boost mode, synthesising from the battery energy, under processor and gate drive circuit control, full wave rectified sinewaves at the filter capacitor 608 for conversion to 50 Hz sinewaves by the H bridge under processor and gate driver control. In the discharge mode the battery energy augments the normal supply to the load.

For battery charging the H bridge, operating under processor and gate driver control, rectifies mains to a 100 Hz full-wave rectified signal at the filter capacitor 608 and the converter 502 operating in buck mode under processor and gate driver control delivers the energy to charge the battery 124. The charging rate is controllable and charging can be done at unity power factor. In some embodiments the converter 502 can operate in a current control mode when charging and/or discharging the battery 124.

In some embodiments the inverter 128 or converter 502 can be used to generate out-of-phase and/or non-sinusoidal current output when discharging the battery. The inverter 128 or converter 502 synthesises the current waveform to be delivered to the load 108 from the DC battery output, and is capable of providing a current waveform that has a predetermined phase angle and/or shape with respect to the mains supply voltage seen at the load 108. The system operator 110 or service provider 120 may request or instruct the controlling apparatus 112 to deliver a discharge current with a certain phase angle and/or waveform shape relative to the voltage and the processor 114 instructs the inverter 128 or converter 502 to generate such a current waveform. Alternatively the controlling apparatus 112 and/or sensor 122 may determine the phase relationship between voltage and current seen at the load 108 based upon measurements of voltage and current waveform cycle timing, and then in response instruct the inverter 128 or converter 502 to deliver a pre-determined phase relationship in the discharge output, in order to provide compensation for a non-ideal measured supply phase relationship at the load 108.

Figure 9:
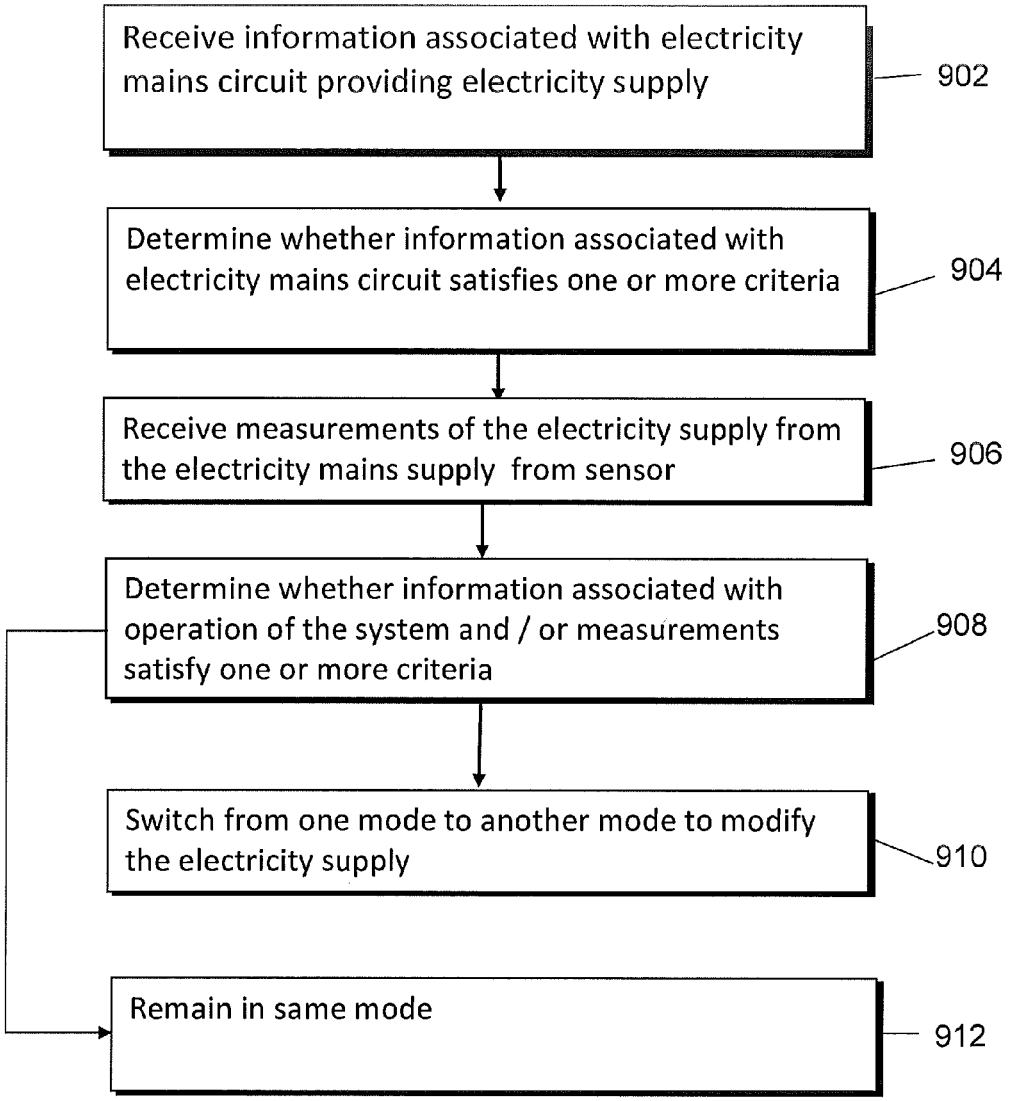
FIG. 9 illustrates a flow diagram of a method according to some embodiments.

Operation of the system 100 for controlling the electricity supply will now be described in further detail with reference to FIG. 9. FIG. 9 discloses a flow diagram of the method according to some embodiments.

Figure 7:
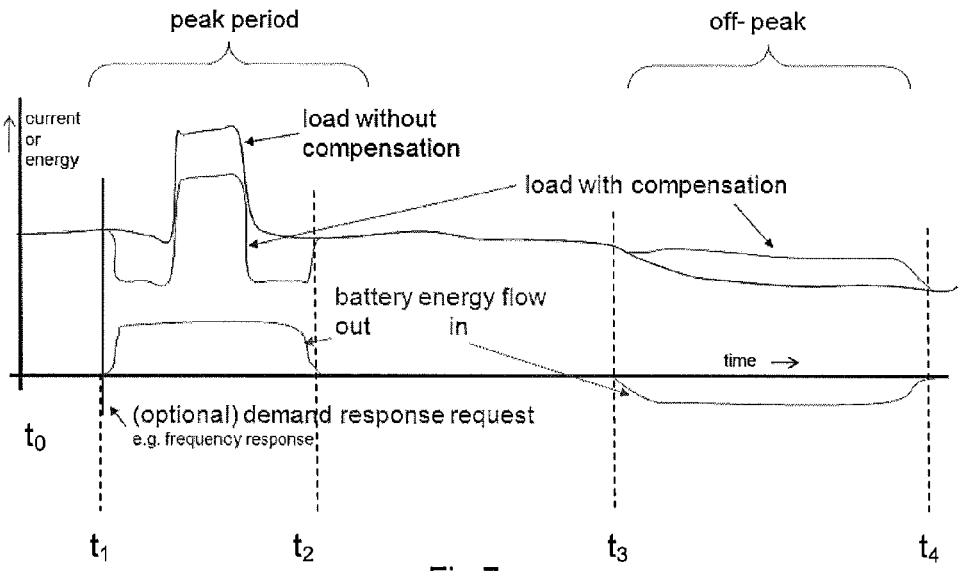
FIGS. 7 and 8 illustrate graphs of time versus current or energy according to some embodiments.

The system 100 can operate in an idle mode whereby the load 108 of the building 104 is being supplied with electricity from the mains electricity circuit 130. The mains electricity circuit 130 is in turn being supplied from the electricity transmission and distribution network 102 via the meter 106. That is, the load 108 is running off mains electricity circuit 130. In the idle mode the battery 124 does not draw or feed any electrical energy to or from the battery from or to the mains electricity circuit 130. In reference to FIG. 7, the system being in the idle mode is represented by $t_0$. FIG. 7 illustrates a graph of time versus energy for some embodiments.

The processor 114 may receive information associated with the mains electricity circuit 130 and/or the associated electricity supply. In some embodiments the information associated with the electricity supply comprises information associated with the electricity transmission and distribution network 102 providing the electricity supply to the mains electricity circuit 130 as shown in block 902. In some embodiments, the processor 114 can receive information comprising an indication of either the condition of the electricity supply, for example frequency or demand level or an indication of the condition of the network.

In some countries the frequency of the electricity supply may be 50 or 60 Hz.

In the UK, the electricity system operators are required to keep the electricity supply at 50 Hz±0.5 Hz. If the frequency changes from 50 Hz, this may indicate a mismatch between supply and demand. The frequency may need to change from 50 Hz by a predetermined amount in order to trigger a change in mode. That amount may be 0.2 Hz or more. However this is by way of example and in some implementations the predetermined amount may be more or less than 0.2 Hz. It should be appreciated that different countries may have different electricity supply frequencies and/or different tolerated deviations. As such this may change the predetermined amount.

In some embodiments, a change in frequency may be determined in order to determine if a mode should be changed.

It should be appreciated that alternatively or additionally another characteristic or parameter of the frequency of the supply (other than frequency value or change in frequency) may be used to trigger a change in mode.

In some embodiments the processor 114 may receive via the communication interface 406 information associated with the capacity of the network. The information associated with the capacity of the network can comprise information regarding the timing of peak and off peak demand on the network and the associated price of electricity. The information can comprise information about the availability of excess electricity from wind, solar or another renewable source at off-peak time. Furthermore the information can comprise the timing and optionally pricing of providing balancing services such as providing fast response frequency balancing services. The information associated with the capacity of the network may be received infrequently such as monthly. Alternatively the information can be received frequently such as every half hour, or as a time-critical immediate request to take action within a pre-determined time period, e.g. a few seconds. The latter request would permit a "real-time" response.

The processor 114 can also receive direct demand response requests from the system operator 110 or the service provider 120 as shown at $t_1$ in FIG. 7. The demand response request may also be received by the communication interface 406. The demand response request may be time critical. In response to receiving the demand response request, the processor 114 may be required to start discharging the battery 124 within a pre-determined time period, e.g. a few seconds. The request may indicate the length of time for which the battery is to be charged/discharged, the rate at which the battery is to be charged/discharged and/or the level to which the battery is to be charged/discharged and/or any other information.

In order to respond quickly to a time-critical demand response or balancing services request, the processor 114 may receive the request via a broadband connection using TCP/IP. TCP/IP or another secure connection protocol is preferred in order to avoid hacking or other security threats. The processor 114 is configured to open connections with the system operator 110 or the service provider 120 and send a message to a server (not shown). The message can interrogate the server as to whether there is an impending time-critical demand response or balancing services event. In some embodiments the processor 114 can receive information indicating that a time-critical demand response or balancing services event is likely. The processor 114 can keep a connection open with the server for a period of time and wait to receive a time-critical demand response or balancing services request. The connection can be configured to time out after a period of time and the processor 114 can re-open a connection with the server. In some embodiments the connection will remain open for 5 minutes. In some embodiments the processor 114 may immediately open a new connection when a previous connection has been closed. When a time-critical demand response or balancing services event is likely, such as during a time of peak capacity, the processor 114 may more frequently open connections with the server than at times during of off-peak capacity.

In some embodiments the processor 114 may optionally receive some messages warning about an impending time-critical demand response or balancing services event. The processor 114 can acknowledge the warning message. Alternatively, the processor 114 can respond to the warning message and indicate that the system 100 is not ready or cannot discharge the battery 124.

The processor 114 may preferably initiate the opening of a connection to the server (not shown) using the hypertext transfer protocol secure (HTTPS). Alternatively the hypertext transfer protocol (HTTP) can be used together with security features to assist with authentication of the controlling apparatus 112. The controlling apparatus 112 may be provided with a unique identification code at the time of manufacture, which can be used for secure log-in to the server.

The processor 114 and server may exchange information in order to test the effectiveness of the connection between them and ensure the connection is capable of meeting the response time requirements. The processor 114 can open a connection to the server and the server can subsequently send a dummy instruction that is not to be acted upon by the processor 114 other than for the processor 114 to establish the speed and quality of the connection and report the result to the server.

The processor 114 on receiving the information from the server of the system operator 110 or service provider 120 will then determine if the information satisfies one or more criteria as shown in block 904.

For example, the processor 114 will determine if the demand response request requires immediate action or a later timed response. Alternatively for example, the processor 114 may determine that the price of the electricity is above a threshold. That is the processor 114 would determine that discharging is preferable when the price of electricity is high.

It should be appreciated that discharging the battery is used to augment the supply of electricity in some embodiments and in others may even replace the electricity supply.

Furthermore the processor 114 can be configured to determine if other information satisfies one or more predetermined criteria. In some embodiments the processor 114 can determine whether the mains electricity is present, and thus whether it is safe to operate the system 100, from information received from the sensor 122 or from other measurement circuits, the discharge being disabled if there is no mains electricity present. The processor 114 may also determine whether other suitable parameters of the electricity transmission and distribution network satisfy predetermined criteria. The processor 114 may receive information about parameters of the electricity transmission and distribution network 102 or about the mains electricity circuit 130 from the sensor 122.

Once the processor 114 has determined that the information of the electricity transmission and distribution network 102 satisfies the correct criteria, the processor determines whether information associated with the system 100 satisfy one or more criteria as shown in block 908 and described below.

The processor 114 can determine information associated with the system 100 from received measurements from the sensor 122 as shown in block 906. The measurements are received from the sensor 122 periodically whilst the sensor is active. That is the measurements can be received before the processor 114 receives the demand response request.

Operation of the current sensor will now be discussed. The sensor 122 in some embodiments continually measures the current of the electricity supply into the building 104. In some buildings 104 the meter 106 is not a smart meter and therefore the meter 106 cannot accommodate a net current flow from the building 104 to the electricity transmission and distribution network 102. Therefore the sensor 122 detects fluctuations of the current of the electricity supply relative to certain thresholds.

The sensor 122 is configured in some embodiments to send a message to the controlling apparatus 112 when the current of the electricity supply into the building 104 makes a transition in either direction through a first current threshold corresponding to the maximum output current of the inverter 128. When the processor 114 determines that the total current of the electricity supply is below that of the maximum output of the inverter 128, the processor 114 does not initiate turning the inverter 128 on if a demand response is requested. Alternatively the processor 114 reduces the maximum current output of the inverter 128 such that output of inverter 128 does not cause a net current out of the building 104. In this way the total net current into the building is kept above 0 amps.

The sensor 122 is also configured to send a message to the controlling apparatus 112 when the current of the electricity supply into the building 104 makes a transition in either direction through a threshold corresponding to a near zero net total current of the electricity supply into the building 104. The processor 114 determines that if the total current into the building 104 is near zero, then the processor 114 initiates the inverter to reduce its output or turn off in order to keep the current of the electricity supply a net inflow. During a period of time where the current value remains above or below either threshold, the wireless current sensor only transmits a periodic signal to indicate to the processor 114 that the sensor 122 is still working and the communication link is good.

In some embodiments the sensor 122 is configured to send a message to the controlling apparatus 112 when the current flowing into the load 108 changes by a value more than a pre-determined amount.

In some embodiments the wireless sensor 122 is configured to operate in a low power mode during certain time periods. During the low power modes, the sensor 122 transmits less or no messages to the controlling apparatus 112. In some embodiments the sensor 122 is configured to operate in a low power mode during the times when a demand response event is not likely to occur, for example in off-peak periods. The processor 114 can send the timings of the periods of time to the sensor 122 when the sensor 122 can operate in a low power mode. In this way the sensor 122 can conserve battery life.

In some embodiments a wired sensor 122 is used with the controlling apparatus 112. In this case the sensor 122 can continuously transmit current measurements to the controlling apparatus 112 and the processor 114 of the controlling apparatus 112 can determine whether the current measurements go above or below pre-determined current thresholds.

The processor 114 determines that the sensor 122 is operational having received at least one or more messages from the wireless sensor within a pre-determined maximum time period. If the processor determines that the sensor 122 is not operational, the processor 114 may avoid discharging the battery 124 because the processor 114 cannot be sure that the net inflow current of the electricity supply will remain above zero. If the processor 114 determines that the sensor 122 has a low battery, the processor 114 can display a notification for a user.

The processor 114 determines whether the inflow current of the electricity supply into the building 104 is above the threshold of the maximum output of the inverter 128. As mentioned above, in embodiments in which there is no smart meter present in the building, the processor 114 may prevent discharging the battery if the discharge of the battery 124 would cause a current outflow of the building 104.

The processor 114 may determine the state of charge of the battery 124. In some embodiments the processor determines whether the charge of the battery is above an upper threshold indicating that the battery has a substantially full charge. For example the processor may initiate the discharge of the battery 124 if the charge of the battery 124 is above 80%.

If the processor determines that the criteria have not been met, the processor 114 determines that the system should stay in the same mode, as shown in block 912. For example, if the system is in the idle mode, the processor 114 determines that the system will remain in the idle mode. Similarly if the system 100 is in the discharging mode or the charging mode, the system will remain in the same mode.

If the processor determines that the criteria have been met, the processor 114 determines that the system should switch from one mode to another mode to modify the electricity supply as shown in block 910.

Switching between modes will be discussed by referring to FIG. 10 which shows a schematic flow diagram of switching between different modes to modify the electricity supply. The processor determines that the system should switch from the idle mode to the discharging mode and initiates the switch as shown in block 1002. In the idle mode, the system 100 is connected to the mains electricity circuit 130 but the system does not feed or draw current to or from the mains electricity circuit. FIG. 7 illustrates the system switching from the idle mode to the discharging mode at time $t_1$.

In the discharging mode, the processor 114 initiates discharge of the battery 124 and subsequently electricity is supplied to the load 108 from the battery 124 via the mains electricity circuit 130 as shown in block 1004. In some embodiments the electricity is supplied to the load 108 from the battery 124 and from the mains electricity supply in the discharging mode.

FIG. 7 indicates discharge of the battery 124 showing the battery 124 energy flow out and the corresponding load of the building 104 being reduced by an equivalent amount.

In some embodiments, preferably when meter 106 is a smart meter, the system 100 may discharge the battery 124 into the load 108 and through the meter 106 into the transmission and distribution network 102.

The processor 114 initiates stopping the discharge of the battery 124 if the system or the electricity transmission network meet certain conditions. In particular the processor is configured to stop the discharge of the battery if one or more of the follow conditions are met; a loss of mains electricity supply, a battery charge of less than a predetermined charge level, e.g. 40%, the inflow current of the mains electricity supply being below the threshold for the near zero net current flow, a wireless current sensor fault, a low price, a request to stop the discharge, a request to start charging, or the expiry of a pre-determined discharge period.

Figure 10:
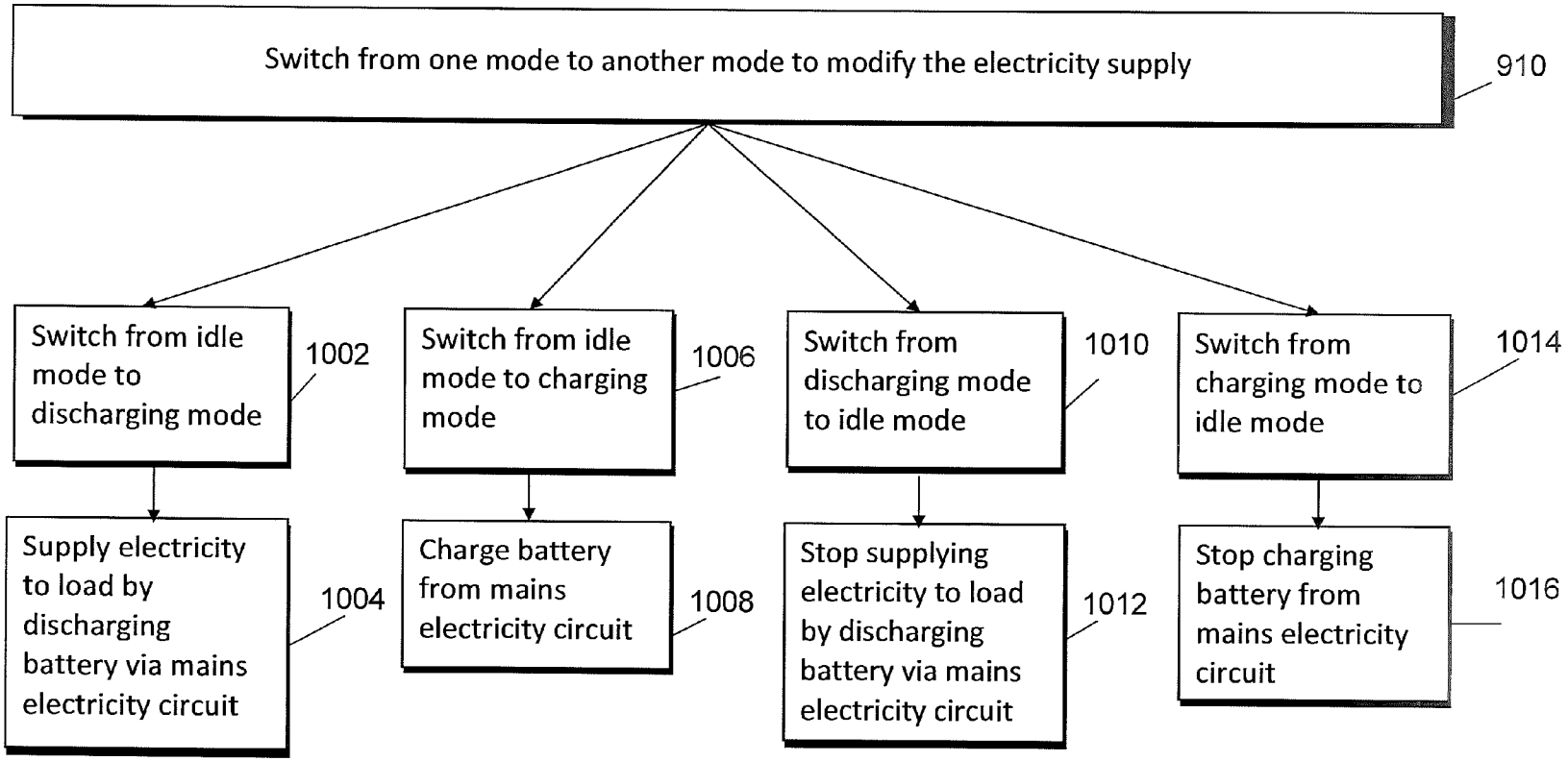
FIG. 10 illustrates a more detailed flow diagram of a method according to some embodiments.

If the criteria are met, the processor 114 then initiates switching from the discharge mode back to the idle mode as shown in block 1010 of FIG. 10. FIG. 7 shows the switch of the system from the discharging mode to the idle mode at time $t_2$. The battery 124 stops discharging and supplying the load via the mains electricity circuit 130 and the load 108 of the building 104 returns to a pre-discharge level as shown in block 1012.

At time $t_3$ the processor 114 determines thart the electricity transmission and distribution network 102 is an off-peak period. In some embodiments the processor 114 will initiate charging the battery 124 if the following conditions are met; the mains electricity supply is present, the battery has a charge of less than a pre-determined charge level, e.g. 90%, and the price of the electricity is low. Alternatively the processor 114 initiates a charging of the battery 124 if a direct charge request is received. The processor 114 determines that the system 100 needs to switch from the idle mode to the charging mode, which is shown in block 1006. The battery 124 is then charged from the mains electricity circuit 130 as shown in block 1008.

FIG. 7 shows that whilst the battery 124 is charging, energy is flowing into the battery 124 and the total load of the building 104 is increased. During the charging mode the mains electricity circuit can supply electricity to the load 108 and the battery 124 via the charger 126. This means that the charging of the battery 124 can be considered to comprise part of the load of the building 104 since the total load of the building 104 increases.

The processor 114 determines that the charging stops on determining one or more of the following conditions; loss of the mains electricity supply, a state of charge of the battery 124 of more than a pre-determined charge level, e.g. 95%, a high price, a direct request to stop charging, a direct request to discharge, or the expiry of a pre-determined charging period.

Time $t_4$ shows the point whereby the battery has stopped being charged and the load 108 returns to a pre-charge load. That is the processor 114 causes the system to switch from the charging mode to the idle mode as shown in block 1014. In this way, the battery 124 stops being charged from the mains electricity circuit 130 as shown in block 1016.

In some embodiments the processor 114 can also cause the system to switch from the discharging mode to the charging mode or vice versa in dependence of information associated with the mains electricity supply.

In some embodiments the processor 114 may initiate a battery maintenance cycle, in response to measurements of battery condition and taking account of information from the system operator 110 or service provider 120 concerning the condition of the electricity transmission and distribution network 102. In some embodiments the processor 114 may initiate a discharge and charge cycle of the battery according to manufacturer's specifications. The processor 114 preferably discharges during peak periods and charges during off peak periods. The processor 114 may ensure that the maintenance is initiated during a period whereby a demand response event is not expected to occur.

In some embodiments the processor 114 may initiate periods of charging the battery 124 in order to ensure the battery is in a state of full charge. The battery 124 may require a top-up charge because the battery 124 may lose a small amount of charge over time. In additional embodiments other maintenance to the battery may be carried out such as maintaining the battery cell balance by charging the battery 124 at an over-voltage and requiring the user to top up the battery with distilled water.

Figure 8:
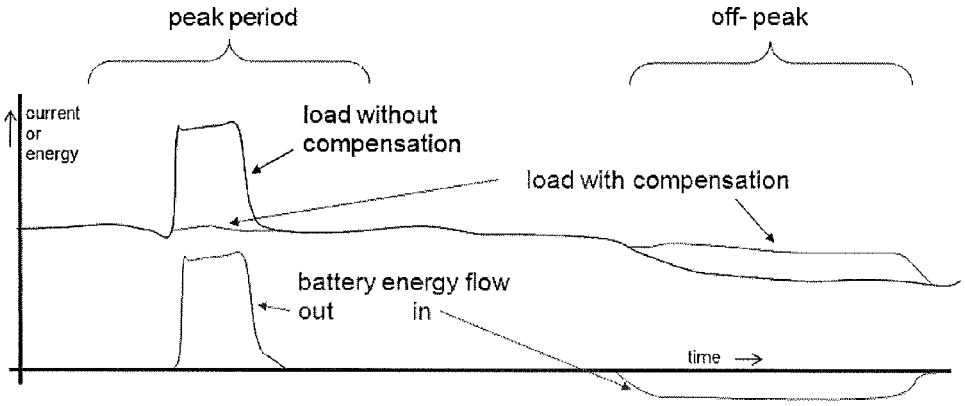

FIG. 8 illustrates a graph of energy versus time according to some embodiments. Operation of the system is similar to the embodiments described with reference to FIG. 7. In addition the processor 114 can be configured to reduce the load 108 of the building 104. The processor 114 detects that a large load such as a washing machine has been switched on during peak usage. The processor receives a message from the wireless sensor 122 that the load has increased and information about the amount of the load current increase, and initiates discharging the battery 124 so as to match the discharge current to the load increase. In this way a peak reduction that emulates the time shift of the appliance is achieved without actually performing time-shifting use of the appliance.

In this way the embodiments do not require the consumer to change their behaviour to implement peak load reduction. Indeed the consumer is not even aware that the system is operating. Furthermore advantageously the system allows time shifting of consumption of electricity and therefore the peaks in electricity usage can be mitigated without the consumer changing behaviour. This means that less electricity generation capacity needs to be built because the electricity usage peaks can be smoothed out and existing capacity is sufficient.

In certain embodiments the processor 114 can record in memory 116 a history of events or log including one or more of the following demand response events, charging events (e.g. timing, duration and amount of energy), discharging events (e.g. timing, duration and amount of energy), and maintenance cycles over a period of time such as a week, month or year. The processor 114 via the interface 406 can initiate a periodic upload of this history to the system operator 110 or service provider 120. Alternatively the system operator 110 or service provider 120 can via the interface 406 interrogate the processor 114 to request an upload of the history. In some embodiments the processor 114 may periodically send a message to notify the status of the system 100 and the availability of the system 100 to the system operator 110 or the service provider 120.

In some embodiments the controlling apparatus 112 can take measurements of the condition of the electricity supply from the transmission and distribution network 102 such as voltage and power factor (phase angle between voltage and current at the load 108) and send the measurements via the interface 406 to the system operator 110 or service provider 120.

In some embodiments the information which is used to switch a mode may need to be present for at least a predetermined length of time. By way of example only, the deviation from a frequency threshold may need to be present for at least a predetermined length of time in order to cause a mode to be switched.

In some embodiments, the system may be associated with a load 108 that is made up of two or more buildings or premises. There may be a meter positioned in the electricity transmission and distribution network. Alternatively there may be no meter and no sensor. The load made up of the two or more buildings or premises may operate in a similar way to the previously described embodiments.

Various different parameters and/or information has been described as being used to control the switching from one mode to another. It should be appreciated, that in some embodiments, only one parameter/information is taken into account. In some embodiments more than one parameter/information may be used. In some embodiments, the information/parameter(s) used to control the switching from one mode to a second may be different from that used when switching from the second or another mode.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment which comprises the combination of two or more embodiments herein described.

The invention claimed is:

[1. An apparatus for controlling an electricity supply to a load comprising:

a controller configured to determine based on information associated with the electricity supply when to switch between a first mode wherein electricity is supplied to the load from a mains electricity circuit and a discharging mode wherein electricity is supplied from a battery to the load via the mains electricity circuit, wherein the controller is configured to determine when to switch to a charging mode, wherein the battery is charged from the mains electricity circuit, wherein the controller is configured to have a connection with an electricity network system operator or a service provider via a communication interface, the communication interface configured to receive the information from the electricity network system operator or the service provider, and wherein the controller is configured to provide second information to the electricity network system operator or the service provider via the communication interface.]

[2. The apparatus as claimed in claim 1, wherein said received information comprises frequency information, wherein said frequency information comprises a frequency of said electricity supply, and wherein said frequency information comprises a deviation of a frequency of said supply from a given value.]

[3. The apparatus as claimed in claim 1, wherein said received information comprises an imbalance between a supply and a demand for the electricity supply.]

[4. The apparatus as claimed in claim 3, wherein said imbalance is indicated by a deviation of a frequency of said supply from a given value.]

[5. The apparatus according to claim 1, wherein said received information comprises one or more parameters of an electricity transmission and distribution network or said electricity supply, wherein the one or more parameters comprise one or more of the following:

time of peak periods of load on the electricity network;

time of off-peak periods of load on the electricity network;

price of electricity;

available capacity of the electricity transmission and distribution network; and time of imbalance between supply and demand on the electricity transmission and distribution network.]

[6. The apparatus according to claim 1, further comprising at least one sensor configured to measure at least one of frequency information, imbalance information and one or more parameters of the electricity supply and to provide information regarding the measurements to the controller.]

[7. The apparatus according to claim 1, wherein the controller is configured to determine that switching between the idle mode and the discharging mode or the charging mode is not required for a time period and to control the communication interface to reduce communication frequency for the time period.]

[8. The apparatus according to claim 1, wherein the controller is configured to store information about switches between the idle mode, the discharging mode and the charging mode over a time period and to send the switching information to an electricity network system operator or a service provider.]

[9. The apparatus as claimed in claim 1, wherein the information comprises a request to switch between the idle mode, the discharging mode, and the charging mode, and wherein said received information comprises a real time command.]

[10. A system comprising the apparatus as claimed in claim 1, at least one battery configured to store energy, a charger configured to charge the battery from a mains electricity circuit when in the charging mode, and an inverter configured to supply the load with an electricity supply from the battery when in the discharging mode, wherein the battery is configured to supply electricity to the mains electricity circuit in the discharging mode and receive electricity from the mains electricity circuit in the charging mode using a single bi-directional connection with the mains electricity circuit.]

[11. The system according to claim 10 wherein the controller is configured to control a waveform of the electricity supply current from the inverter to the load.]

[12. A method for controlling an electricity supply to a load comprising:

determining when to switch between a first mode wherein the load is supplied from a mains electricity circuit, and a discharging mode wherein the electricity is supplied to the load from a battery via the mains electricity circuit;

wherein the determining is based on information associated with the electricity supply, and wherein said information comprises one or more parameters of an electricity transmission and distribution network or said electricity supply, wherein the one or more parameters comprise one or more of the following:

time of peak periods of load on the electricity network;

time of off-peak periods of load on the electricity network;

price of electricity;

available capacity of the electricity transmission and distribution network; and time of imbalance between supply and demand on the electricity transmission and distribution network.]

[13. A computer program comprising program code adapted to perform the steps of claim 12 when the program code is run on at least one processor.]

[14. The method as set forth in claim 12, further comprising determining information comprising sensing at least one of frequency information, imbalance information and one or more parameters of the electricity supply.]

[15. The method as set forth in claim 12, further comprising detecting a loss of the electricity supply from the electricity transmission and distribution network and preventing discharging of the battery when said loss is detected.]

[16. The method as set forth in claim 12, further comprising storing information about switches between the idle mode, the discharging mode, and a charging mode over a time period and communicating the switching information to an electricity network system operator or a service provider.]

[17. The method of claim 12, wherein said imbalance is indicated by a deviation of a frequency of said supply from a given value.]

[18. An apparatus for controlling an electricity supply to a load comprising:

a controller configured to:

determine based on information associated with the electricity supply when to switch between a first mode wherein electricity is supplied to the load from a mains electricity circuit and a discharging mode wherein electricity is supplied from a battery to the load via the mains electricity circuit, and determine when to switch to a charging mode, wherein the battery is charged from the mains electricity circuit; and a communication interface configured to receive the information from an external source, wherein the information comprises a request to switch between an idle mode, the discharging mode, and the charging mode, and wherein said received information comprises a real time command.]

[19. The apparatus as set forth in claim 18, wherein the controller is configured to store information about switches between the idle mode, the discharging mode, and the charging mode over a time period and to send the switching information to an electricity network system operator or a service provider.]

[20. A system comprising an apparatus as claimed in claim 18, at least one battery configured to store energy, a charger configured to charge the battery from a mains electricity circuit when in the charging mode, and an inverter configured to supply the load with an electricity supply from the battery when in the discharging mode, wherein the battery is configured to supply electricity to a mains electricity circuit in the discharging mode and receive electricity from the mains electricity circuit in the charging mode using a single bi-directional connection with the mains electricity circuit.]

[21. The system according to claim 20, wherein the controller is configured to control a waveform of the electricity supply current from the inverter to the load.]

[22. The apparatus according to claim 18, wherein the controller is configured to prevent discharging of the battery if a loss of the electricity supply from an electricity transmission and distribution network is detected.]

[23. The apparatus according to claim 18, wherein:

the communication interface is configured to receive the information from an electricity network system operator or a service provider; and the controller is configured to have a connection with the electricity network system operator or the service provider via the communication interface, and wherein the controller is configured to provide second information to the electricity network system operator or the service provider via the communication interface.]

*24. An apparatus comprising:*

*a communication interface configured to connect with an electricity network system operator or a service provider and receive information from the electricity network system operator or the service provider; and*

*a processor communicatively connected to the communication interface and configured to:*

*control a supply of electricity from a mains electricity circuit to a load;*

*control discharge of a supply of electricity from a battery to the load;*

*based on received information from the electricity network system operator or the service provider of an increased electricity requirement at the load comprising information that an additional load has been switched on during a peak usage time period, determine to supplement the load with electricity from the battery in addition to the supply of electricity provided from the mains electricity circuit to the load, and control the battery to discharge a current from the battery which substantially matches the additional load; and*

*provide second information about the supply of electricity to the electricity network system operator or the service provider via the communication interface.*

*25. The apparatus according to claim 24, further comprising:*

*at least one sensor configured to sense electrical current information of the supply of electricity from the mains electricity circuit to the load, and to provide the electrical current information to the processor.*

*26. The apparatus according to claim 25, wherein the processor is further configured to cause the battery to discharge electricity to the load when it is determined, based on the received information, that a current of the supply of electricity from the mains electricity circuit to the load reaches a predetermined value.*

*27. The apparatus according to claim 26, wherein the predetermined value comprises an increase above a threshold value.*

*28. The apparatus according to claim 27, wherein the processor is further configured to cause the battery to discharge a current from the battery which substantially matches the increase above the threshold value.*

*29. The apparatus according to claim 25, wherein the at least one sensor is further configured to sense at least one of frequency information, imbalance information, or one or more parameters of the supply of electricity, and to provide the sensed information to the processor.*

*30. The apparatus according to claim 25, wherein the at least one sensor comprises a wireless sensor.*

*31. The apparatus according to claim 25, wherein the processor is further configured to use the electrical current information from the at least one sensor to operate a safety switch to disconnect the mains electricity supply from the load.*

*32. The apparatus according to claim 25, wherein the processor is further configured to use the electrical current information from the at least one sensor to prevent a net current outflow into the mains electricity circuit from at least one of the load or the battery.*

*33. The apparatus according to claim 24, wherein the processor is further configured to store operational data, the operational data comprising one or more of: battery charging events, battery discharging events, or maintenance cycles.*

*34. The apparatus according to claim 24, wherein the processor is further configured to control a waveform of the supply of electricity.*

*35. The apparatus according to claim 24, wherein the communication interface is further configured to communicate information with the electricity network system operator or the service provider using a secure internet protocol connection.*

*36. The apparatus according to claim 35, wherein the communication interface is further configured to communicate with other apparatuses or systems using the secure internet protocol connection.*

*37. The apparatus according to claim 24, wherein the load comprises a building.*

*38. A method comprising:*

*controlling, by a processor communicatively coupled to a communication interface, a supply of electricity from a mains electricity circuit to a load;*

*controlling, by the processor, discharge of a supply of electricity from a battery to the load;*

*based on received information from an electricity network system operator or a service provider of an increased electricity requirement at the load comprising information that an additional load has been switched on during a peak usage time period, determining, by the processor, to supplement the load with electricity from the battery in addition to the supply of electricity provided from the mains electricity circuit to the load, and controlling the battery to discharge a current from the battery which substantially matches the additional load; and*

*providing, by the processor, second information about the supply of electricity to the electricity network system operator or the service provider via the communication interface.*

*39. The method according to claim 38, further comprising:*

*sensing electrical current information of the supply of electricity from the mains electricity circuit to the load;*

*providing the electrical current information to a processor; and*

*causing the battery to discharge electricity to the load when it is determined, based on the received information, that a current of the supply of electricity from the mains electricity circuit to the load reaches a predetermined value.*

*40. A non-transitory computer readable medium containing instructions that, when executed by at least one processing device, cause the at least one processing device to:*

*control a supply of electricity from a mains electricity circuit to a load;*

*control discharge of a supply of electricity from a battery to the load;*

*based on received information from an electricity network system operator or a service provider of an increased electricity requirement at the load comprising information that an additional load has been switched on during a peak usage time period, determine to supplement the load with electricity from the battery in addition to the supply of electricity provided from the mains electricity circuit to the load, and control the battery to discharge a current from the battery which substantially matches the additional load; and*

*provide second information about the supply of electricity to the electricity network system operator or the service provider via a communication interface communicatively coupled to the at least one processing device.*

* * * * *